(12) United States Patent
Villeret et al.

(10) Patent No.: US 11,060,627 B2
(45) Date of Patent: Jul. 13, 2021

(54) METHOD FOR CONNECTING AT LEAST TWO FLUID VALVES AND THE SYSTEM FOR FLUID COMMUNICATION IMPLEMENTED

(71) Applicant: OUT AND OUT CHEMISTRY SPRL, Philippeville (BE)

(72) Inventors: Guillaume Villeret, Dimont (FR); Vincent Luc Antoine Tadino, Chastres (BE); Marc Lorent, Givet (FR); Adrien Orleans, Mons (BE)

(73) Assignee: OUT AND OUT CHEMISTRY SPRL, Philippeville (BE)

( * ) Notice: Subject to any disclaimer, the term of this patent is extended or adjusted under 35 U.S.C. 154(b) by 15 days.

(21) Appl. No.: 16/481,812

(22) PCT Filed: Jan. 31, 2018

(86) PCT No.: PCT/EP2018/052342
§ 371 (c)(1),
(2) Date: Jul. 29, 2019

(87) PCT Pub. No.: WO2018/141767
PCT Pub. Date: Aug. 9, 2018

(65) Prior Publication Data
US 2020/0003317 A1    Jan. 2, 2020

(30) Foreign Application Priority Data

Jan. 31, 2017    (BE) ................................. 2017/5057

(51) Int. Cl.
*F16K 27/00* (2006.01)
*F15B 13/08* (2006.01)
(Continued)

(52) U.S. Cl.
CPC ........ *F16K 27/003* (2013.01); *F15B 13/0817* (2013.01); *F15B 13/0825* (2013.01);
(Continued)

(58) Field of Classification Search
CPC .......................... F16K 27/003; F15B 13/0817
See application file for complete search history.

(56) References Cited

U.S. PATENT DOCUMENTS 8,505,576 B2 * 8/2013 Renninger .......... F16K 27/0263
137/597
2009/0139591 A1    6/2009 Okamoto
(Continued)

FOREIGN PATENT DOCUMENTS

DE    1 019 134    11/1957
DE    1 891 716    4/1964
(Continued)

OTHER PUBLICATIONS

International Search Report and Written Opinion for corresponding PCT Application No. PCT/EP2018/052342, dated May 4, 2018 (11 sheets).

*Primary Examiner* — Kevin L Lee
(74) *Attorney, Agent, or Firm* — Lewis Roca Rothgerber Christie LLP

(57) ABSTRACT

Method for connecting, in a fluid manner, a system (100) for fluid communication comprising a first (10) and a second (20) fluid valve and comprising the following steps:— providing a first (10) and a second (20) fluid valve, —providing a first pipe (60), —inserting each of the ends (61, 62) of the first pipe (60) into each of the fluid valves (10, 20) in order to form a fluid assembly (100), —providing a compression means (1) comprising two ends (2, 3), —positioning said two ends (2, 3) of said compression means (1) on either side of said fluid assembly (100), —applying a
(Continued)

compression force onto said fluid assembly (100) via the compression means (1).

15 Claims, 4 Drawing Sheets

(51) Int. Cl.
*F16L 37/14* (2006.01)
*F16L 37/56* (2006.01)

(52) U.S. Cl.
CPC ......... *F15B 13/0839* (2013.01); *F16L 37/144* (2013.01); *F16L 37/56* (2013.01)

(56) References Cited

U.S. PATENT DOCUMENTS

2019/0178393 A1* 6/2019 Gagne et al. ............. F16K 7/06
2020/0230634 A1* 7/2020 Piscol et al. .......... B05B 12/149

FOREIGN PATENT DOCUMENTS

EP   1 273 839 A1   1/2003
JP   10-38118 A     2/1998

\* cited by examiner

US 11,060,627 B2

METHOD FOR CONNECTING AT LEAST TWO FLUID VALVES AND THE SYSTEM FOR FLUID COMMUNICATION IMPLEMENTED

CROSS-REFERENCE TO RELATED APPLICATION(S)

This application is a National Phase Patent Application of International Application Number PCT/EP2018/052342, filed on Jan. 31, 2018, which claims priority to Belgium Patent Application Number 2017/5057, filed on Jan. 31, 2017, the entire contents of both of which are incorporated herein by reference.

TECHNICAL FIELD

According to a first aspect, the invention relates to a method for connecting two fluid valves in a fluid manner.

According to a second aspect, the invention relates to a system for fluid communication.

PRIOR ART

For the development of new syntheses of pharmaceutical products, for example drugs, the use of pipes having multiple valves is required in a controlled manner (manifold, for example the 3-way Stopcock® marketed by the company Medex®).

Research laboratories use machines provided with permanent valves and permanent pipes until clinical phase 3.

Starting from clinical phase 3, the use of disposable kits comprising controlled valves and pipes is required for the productions that follow good manufacturing practices (GMP).

The main problem during the development of new compounds occurs during the passage from a machine allowing the control of permanent valves to a machine with control of disposable valves. This transition from one type of machine to another (permanent to disposable), very often requires adaptation of the chemistry sequence since the types of valves, their volumes and their connections change. This adaptation is very costly in terms of raw materials, time of use of equipment, human resources and leads, in fine, to an additional delay for the passage to more advanced phases of development and greater costs.

The machines provided with permanent valves and pipes do not allow the use of valves and pipes disposable. The machines allowing the control of the valves of disposable kits do not have an equivalent to the kit of disposable valves consisting of permanent valves.

The disposable kits comprising disposable valves and pipes and generally have small spacing between the valves. This small spacing is in particular desired in order to reduce the volumes non-useful in the pipes. This small spacing is in particular made possible by the manufacturing methods used, for example injection moulding. The relatively small spacing between the valves makes the design of a permanent system comprising valves and pipes, having good impermeability and comprising elements available on the market very difficult.

The valves available on the market are provided with inner threads in their ports in order to allow fluid connection to a screwed-on nozzle of a pipe or accessory (for example: a plug, an adapter, a syringe). A plurality of problems occur when two valves close to one another must be connected to a pipe provided with a thread on its ends. The valves commercially available have, for example, right-handed threads. In order to arrange two valves side by side with a straight pipe (in order to limit the length of the pipe), this involves having a pipe having a right-handed thread on one end and a left-handed thread on its other end. However, the impermeability of this assembly is provided by the contact of the pipe with the bottom of the openings of valves (with the valve body). In order to guarantee a good seal, this involves applying sufficient tightening that does not necessarily allow the orientation of the valves, and more particularly of the stems of the valves, to be controlled. The stems of valves or control stems of valves allow the control of the valves. Indeed, the valves, in order to be controlled by a machine allowing the control of valves, must have their stems or members of valves parallel to each other. However, the use of a pipe with threaded ends does not guarantee that the two fluid valves have their stems of valves parallel or that they have a sealed fluid connection.

A plurality of solutions have already been developed such as providing deformable pipe ends in order to guarantee a good seal and have stems of valves parallel. However, this solution does not guarantee a good seal over time and poses the risk of having dead volumes in this deformable portion.

Another solution developed involves using a pipe made of two portions, the two portions of which are screwed into each of the ports to be connected. The two portions are then connected to each other by being clamped via a linking element, for example a nut. This solution has a reduced possibility of leaks at the valve-pipe connections however, this solution has a risk of leakage that appears at the connection with the linking element between the two pipe portions.

At present, there is no realistic solution of connecting two fluid valves to each other, while respecting a fixed, small spacing (distance between the control stems, for example) of approximately 3 centimetres and while preserving parallelism between the stems of valves. The two solutions tested and mentioned above do not allow such an assembly. Either the centre-to-centre distance between the valves is respected but the impermeability and the fact that the control stems of valves are parallel is not guaranteed, or the impermeability is guaranteed but the centre-to-centre distance or the parallelism of the stems of valves is not correct.

The three parameters to be respected in order to be able to replace kits of disposable valves with permanent valves are: the centre-to-centre distance between the valves, the impermeability of their connection and the parallelism of the stems of valves. At present, there is no solution allowing this problem to be overcome.

SUMMARY OF THE INVENTION

According to a first aspect and with the goal of reducing the cost of the test syntheses during research and at first eliminating the use of disposable kit the inventors propose a method for connecting, in a fluid manner, a first and a second fluid valve in a first direction X and comprising the following steps:
  a. providing said first and second fluid valve,
    said first fluid valve comprising at least two first ports each having an opening towards the outside of the first fluid valve;
    said second fluid valve comprising at least two second ports each having an opening towards the outside of the second fluid valve;
  b. providing a first pipe having a first and a second end:

the first end being suitable for being inserted into an opening of a first port of the first fluid valve;

the second end being suitable for being inserted into an opening of a second port of the second fluid valve;

c. inserting the first end of the first pipe into an opening of a first port of the first fluid valve and inserting the second end of the first pipe into an opening of a second port of the second fluid valve, in order to form a fluid assembly;

d. providing a first compression means comprising two ends in order to compress said fluid assembly comprising said first and second fluid valve and said first pipe in said first direction X between said two ends;

e. positioning said two ends of said first compression means on either side of said fluid assembly in said first direction X;

f. applying a compression force, in parallel to said first direction X, onto said fluid assembly via said first compression means in order to compress said first pipe between said first and second fluid valve.

The advantages associated with this method for connecting fluid valves to each other are that this method allows at least two valves to be connected to each other easily, in a fluid and sealed manner, with a spacing that is small and can be precisely determined between two valves. This method allows a fluid assembly consisting of permanent and reusable valves to be adapted to a system for the control of disposable valves.

The advantage of using a method for compressing a pipe in valves fluid that is external to the pipe and to the valves provides a centre-to-centre distance, a parallelism of the valve actuators and good impermeability of the fluid assembly.

This method allows fast assembly and also allows disassembly for the cleaning of the valves and pipes.

The advantage of this method is that the clamping between the end of the pipe and the valve body can be adjusted without this affecting the parallelism of the valve actuators.

This method allows the centre-to-centre distance between the valves to be adapted by modifying the length of the pipe and by modifying the length of the compression means in order to be able to adapt to different type of machine allowing the control of disposable valves.

The proposed method allowing a sealed fluid connection can be reproduced with the same elements after their disassembly and cleaning for example. The method uses valves and pipes that can be disassembled and cleaned regularly.

Preferably, said first and second ends of the first pipe have a smooth outer wall.

The advantage of having pipes having ends that have a smooth outer wall is that the pipe can be easily cut from a longer pipe, the entire outer wall of which is smooth. The fact that the outer walls of the ends of the pipe are smooth does not require a thread on said walls. This facilitates the machining of the pipe and the assembly of the pipe in the openings of the ports of the fluid valves.

Preferably, said first and second end of the first pipe are smooth.

The advantage of having a first pipe, the ends of which are smooth, is that the first pipe can be easily cut from a longer pipe without the section cut requiring additional machining of its cutting faces. The fact that the ends of the pipe are smooth does not require the creation of a groove in order to house a sealing means, for example a joint. Moreover, the creation of a groove at the end of a pipe is a machining that requires great precision and specific machining tools. An end of a pipe preferably corresponds to an edge obtained during the cutting of a pipe. The cutting of a straight pipe being preferably done perpendicularly to the main direction of the pipe. A groove at the end of a pipe being able to be defined as a cavity hollowed out starting from the surface of the end and extending in the material of the pipe in a manner substantially parallel to the main direction of the pipe.

Via an adaptation of the compression means and in particular of the distance between the two ends of said means, a pipe with smooth ends allows good modularity of the centre-to-centre distance between the valves without requiring any machining other than the cutting of the pipe to the dimensions defined by the centre-to-centre distance and optionally a deburring of said cut.

Preferably, said two ends of the first compression means are two plates and said first compression means further comprises:

a hollow profile suitable for receiving the first and second fluid valve;

fastening means for fastening said two plates to two ends of said hollow profile.

There are multiple advantages to the compression means consisting of a hollow profile and of two elements of ends that can be fastened to the ends of the hollow profile in order to maintain the fluid valves and the pipe under compression. The compression means allows, during the fastening of the ends to the hollow profile, into which the valves and the pipe are inserted, the pipe to be compressed in the openings of the ports of the valves. The compression means eliminates the need to assemble an end of the pipe in a port of a fluid valve to the means of a thread, of a glue or of an assembly via fitting together, for example. Moreover, it is not necessary, in the case of a smooth end, to provide, for example, a right-handed thread and a left-handed thread on one and the other of the ends of the pipe. The hollow profile also has the advantage of being able to be cut to different lengths in order to obtain an assembly having a centre-to-centre distance between the fluid valves. This aspect provides a compression means that can be easily adapted to various centre-to-centre distances between fluid valves.

Moreover, the hollow profile provides a means for guiding the fluid valves in order to ensure:

the parallelism between the control stems the collinearity between the openings of the fluid valves.

Preferably, step a. also comprises the fact that a sixth and a seventh fluid valves are provided;

said sixth fluid valve comprising at least two sixth ports each having an opening towards the outside;

said seventh fluid valve comprising at least two seventh ports each having an opening towards the outside;

step b. also comprises the fact that a fifth and a sixth pipe are provided;

said fifth pipe having a first and a second end:

the first end of the fifth pipe being suitable for being inserted into an opening of a first port of the first fluid valve;

the second end of the second pipe being suitable for being inserted into an opening of a sixth port of the sixth fluid valve;

said sixth pipe having a first and a second end:

the first end of the sixth pipe being suitable for being inserted into an opening of a second port of the second fluid valve;

the second end of the sixth pipe being suitable for being inserted into an opening of a seventh port of the seventh fluid valve;

said seventh pipe having a first and a second end:
the first end of the seventh pipe being suitable for being inserted into an opening of a sixth port of the sixth fluid valve;
the second end of the seventh pipe being suitable for being inserted into an opening of a seventh port of the seventh fluid valve and in that;
step c. also comprises the fact that:
the first end of the fifth pipe is inserted into an opening of a first port of the first fluid valve and the second end of the fifth pipe is inserted into an opening of a sixth port of the sixth fluid valve;
the first end of the sixth pipe is inserted into an opening of a second port of the second fluid valve and the second end of the sixth pipe is inserted into an opening of a seventh port of the seventh fluid valve;
the first end of the seventh pipe is inserted into an opening of a sixth port of the sixth fluid valve and the second end of the seventh pipe is inserted into an opening of a seventh port of the seventh fluid valve,
in order to form an extended fluid assembly;
step d. also comprises the fact that the following are provided:
a second compression means comprising two ends in order to compress said extended fluid assembly in a second direction Y between said two ends;
a third compression means comprising two ends in order to compress said sixth, seventh fluid valve and seventh pipe in the first direction X between said two ends;
step e. also comprises the fact that:
said two ends of said second compression means are positioned on either side of said extended fluid assembly in said second direction Y;
said two ends of said third compression means are positioned on either side of said sixth, seventh fluid valve and seventh pipe in said first direction X;
step f. also comprises the fact that a compression force is applied in parallel to said second direction Y onto said extended fluid assembly via said second compression means in order to compress said fifth and sixth pipe together with said first and sixth fluid valve and said second and seventh fluid valve, respectively.
Preferably,
step a. also comprises the fact that a third, a fourth and a fifth fluid valve are provided;
said third fluid valve comprising at least two third ports each having an opening towards the outside;
said fourth fluid valve comprising at least two fourth ports each having an opening towards the outside;
said fifth fluid valve comprising at least two fifth ports each having an opening towards the outside, in that
step b. also comprises the fact that a second, a third and a fourth pipe are provided;
said second pipe having a first and a second end:
the first end of the second pipe being suitable for being inserted into an opening of a second port of the second fluid valve;
the second end of the second pipe being suitable for being inserted into an opening of a third port of the third fluid valve;
said third pipe having a first and a second end:
the first end of the third pipe being suitable for being inserted into an opening of a third port of the third fluid valve;
the second end of the second pipe being suitable for being inserted into an opening of a fourth port of the fourth fluid valve;
said fourth pipe having a first and a second end:
the first end of the fourth pipe being suitable for being inserted into an opening of a fourth port of the fourth fluid valve;
the second end of the fourth pipe being suitable for being inserted into an opening of a fifth port of the fifth fluid valve and in that;
step c. also comprises the fact that:
the first end of the second pipe is inserted into an opening of a second port of the second fluid valve and the second end of the second pipe is inserted into an opening of a third port of the third fluid valve;
the first end of the third pipe is inserted into an opening of a third port of the third fluid valve and the second end of the third pipe is inserted into an opening of a fourth port of the fourth fluid valve;
the first end of the fourth pipe is inserted into an opening of a fourth port of the fourth fluid valve and the second end of the fourth pipe is inserted into an opening of a fifth port of the fifth fluid valve;
in order to form said fluid assembly.

The advantage of the method allowing five fluid valves to be connected by four pipes with the compression means is that the assembly of all these elements can be carried out very quickly. The fact that the pipes have smooth ends allows them to be easily cut from a longer pipe and be easily replaced or cleaned. The advantage of this method is to be able to assemble, in a fluid manner, a multitude of pipes and valves while having to activate a single compression system. Moreover, by adapting the length of the profile of the compression means and the length of each of the pipes, the centre-to-centre distances between the fluid valves can be easily adapted. Such modularity is mainly possible because of the fact that the ends of the pipes must only be smooth and do not require any other particularity as is described with respect to the first pipe. In particular, the pipe does not require a groove in order to houses a sealing means at any one of the ends.

According to a second aspect, the inventors propose a system for fluid communication, comprising:
a fluid assembly comprising:
a first and a second fluid valve in a first direction X:
said first fluid valve comprising two first ports each having an opening towards the outside;
said second fluid valve comprising two second ports each having an opening towards the outside;
a first pipe:
having a first and a second end;
located between said first and second fluid valve in such a way that said first end of the first pipe is housed in an opening of a first port of the first fluid valve and said second end of the first pipe is housed in an opening of a second port of the second fluid valve;
a first compression means, mechanically coupled to said fluid assembly, and comprising at least two ends located on either side of said fluid assembly, in order to compress said first pipe between said first and second fluid valve, in said first direction X.

The alternatives and advantages mentioned for the first aspect of the invention apply to the system for fluid communication according to the second aspect, mutatis mutandis.

The advantage of the system for fluid communication is that it allows a sealed fluid assembly to be produced. The sealed fluid assembly is obtained without the addition of a sealing means such as a sealing joint for example. The impermeabilities of the fluid assembly are created between the end of a pipe and the opening of a fluid valve. Another advantage of the system for fluid communication is that it allows the creation of a sealed fluid assembly that only requires fluid elements to be fitted together. The function of clamping the fluid elements together (fluid valves and pipes) is dissociated from these elements in order to allow good control of the centre-to-centre distances between the fluid valves and of the parallelism of the actuators of fluid valves to each other while preserving good impermeability. The clamping force of the compression means alone allows a good seal between a valve and a pipe to be guaranteed.

The advantage of the system for fluid communication is that it allows a good seal between a valve and a pipe having a smooth pipe end to be provided. Such a system for fluid communication also does not require the use of means of impermeabilities or of joints between the edges of pipes and the fluid valves. This further provides a system for fluid communication that is very simple to assemble and has a centre-to-centre distance that can be easily modulated. Indeed, if means of impermeabilities need to be used, their positioning can be problematic during the assembly of the system for fluid communication according to the invention. The positioning of a large number of sealing means before the compression is difficult and does not allow good centring of the means of impermeabilities, for example joints of impermeabilities, to be guaranteed.

The dissociation of the function of clamping the fluid elements allows assembly and easy disassembly that only requires an activation or a release of the clamping function in order to be able to assemble or disassemble the entire system for fluid communication.

The system for fluid control allows easy adaptation to a valve controller having a multitude of control of valves having centre-to-centre distances that can vary, by adapting the length of the pipes and the size of the compression means.

Preferably, said first pipe has a smooth outer surface.

A pipe having smooth ends provides an element that is extremely simple, easy to cut to the right length and easily replaceable and can be inter changed with pipes from a similar assembly.

Preferably, said first pipe has a first and a second smooth end.

The advantage of a pipe having smooth ends is that the pipe is easy to cut without the risk of damaging a thread present at the ends. Moreover, the pipe does not have a left or right side that must be identified. A pipe having smooth ends is also less costly than a pipe having threaded ends.

Preferably, the first pipe has a circular cross-section in planes substantially perpendicular to its length.

The use of a pipe having a circular cross-section has the advantage that this is the most common shape of available pipes.

Preferably, the first and second fluid valve comprise three ports in a T configuration.

Preferably, said first pipe is made of Poly(etheretherketone) (PEEK).

The advantage of using a pipe made of PEEK is that PEEK is a material having good rigidity, that is to say, a high Young's modulus and good breaking strength. PEEK is also chemically inert. PEEK is easy to machine and to cut and is available commercially in the form of a bar having a round cross-section or in the form of a pipe Preferably, the first and second fluid valve comprise, respectively:
a first and a second valve body;
said first valve body of the first fluid valve comprising two first ports;
said second valve body of the second fluid valve comprising two second ports;
a first and a second valve-body lining;
said first lining of the valve body of the first valve comprising two openings centred on the two first ports;
said second lining of the valve body of the second valve (20) comprising twoo openings centred on the two second ports.

Preferably, said first and second valve body are made of a plastic material.

Preferably, said first and second valve body are made of a polymer resistant to solvents.

Preferably, said first and second valve body are made of a Teflon® polymer.

Preferably, the material of said valve bodies is more flexible than the material of said first pipe.

Preferably, said first pipe is rigid in such a way as to define a spacing between said first and second fluid valve during their compression by said first compression means.

Preferably, that the centre-to-centre distance between said first and second fluid valve is defined by the length of said first pipe and by the compression force.

Preferably, said first pipe forms sealed connections betweens its first and second ends and the first and second fluid valve.

Preferably, the fluid connections between said first and second end of said pipe and the first and second valve are sealed for pressures between atmospheric pressure and $5 \times 10^5$ Pa.

Preferably, the fluid connections between said first and second end of said pipe and the first and second fluid valve are sealed for pressures lower than atmospheric pressure.

Preferably, the system for fluid communication further comprises a controlled system for controlling fluid valves.

Preferably, the system for fluid communication further comprises a first and a second coupling means and a first and a second stem of valves, characterised in that:
said first valve stem allowing the movement of said first fluid valve being connected to said controlled system for controlling fluid valves by said first coupling means;
said second valve stem allowing the movement of said second fluid valve being connected to said controlled system for controlling fluid valves by said first coupling means.

The advantage of the presence of means of couplings for each of the fluid valves is that these coupling means allow each of the fluid valves to be connected to a controlled system for controlling actuators of valves. The advantage of the system for fluid communication is that is allows easy adaptation of the centre-to-centre distances between the valves in order to be able to be connected to various controlled systems for control of the actuators of valves.

Preferably, said first compression means comprises:
a hollow profile suitable for receiving the fluid valves;
two ends of a compression means, suitable for compressing the pipe and said valves fluid in said profile;
means for fastening said ends of the first compression means to said profile.

The advantage of the compression means consisting of a hollow profile and of two ends that allow the compression of the valves and pipes is that it allows the function of maintaining the pipes in the fluid valves to be dissociated from the sealing function. Dissociating the function of maintaining the pipes in the fluid valves from the sealing function allows the actuators of fluid valves to be positioned parallel to each other without altering the seal between the pipes and the fluid valves. The hollow profile also provides a function of guiding the fluid valves that allows their actuators of valves to be positioned in a parallel manner. The guiding function of the hollow profile also allows the collinearity of the openings of valves to be guaranteed in order to allow easy assembly of the valves and pipes.

The advantage of compressing the fluid valves and the pipe via a single compression means according to the invention allows the same compression force to be applied to each of the end-of-pipe and valve-body interfaces. Applying the same force to all the interfaces allows impermeabilities of the same order of magnitude to be obtained at each of the fluid connections and there is no risk of unclamping of one of the element leading to a leaks in the system for fluid communication.

For example, the fastening means are screws for said two ends to the hollow profile.

Preferably, the fluid assembly further comprises:
a sixth and a seventh fluid valve:
said sixth fluid valve comprising at least two sixth ports each having an opening towards the outside;
said seventh fluid valve comprising at least seventh ports (each having an opening towards the outside;
a fifth pipe:
having a first and a second end in a second direction Y;
located between said first and sixth fluid valves in such a way that said first end of the fifth pipe is housed in an opening of a port of the first fluid valve and said second end of the fifth pipe is housed in an opening of a port of the sixth fluid valve;
a sixth pipe:
having a first and a second end in said second direction Y;
located between said second and seventh fluid valve in such a way that said first end of the sixth pipe is housed in an opening of a port of the second fluid valve and said second end of the sixth pipe is housed in an opening of a port of the seventh fluid valve;
a seventh pipe:
having a first and a second end in said first direction X;
located between said sixth and seventh fluid valve in such a way that said first end of the seventh pipe is housed in an opening of a port of the sixth fluid valve and said second end of the seventh pipe is housed in an opening of a port of the seventh fluid valve;
in order to form an extended fluid, said extended fluid assembly further comprising:
a second compression means, mechanically coupled to said extended fluid assembly, and comprising at least two ends located on either side of said extended fluid assembly in said second direction Y, in order to compress said fifth and sixth pipe between said first and sixth fluid valve and said second and seventh fluid valve, respectively;
a third compression means, mechanically coupled to said sixth, seventh fluid valve and seventh pipe, comprising at least two ends located on either side of said sixth, seventh fluid valve and seventh pipe, in said first direction X, in order to compress said seventh pipe between said sixth and seventh fluid valve;

said sixth and seventh fluid valve having outer dimensions identical to said first and second fluid valve, said seventh pipe being identical to said first pipe and said fifth and sixth being identical to each other.

Preferably, the fluid assembly comprises:
a third, a fourth and a fifth fluid valve:
said third fluid valve comprising at least two third ports each having an opening towards the outside;
said fourth fluid valve comprising at least two fourth ports each having an opening towards the outside;
said fifth fluid valve comprising at least two fifth ports each having an opening towards the outside;
a second pipe:
having a first and a second end;
located between said second and third fluid valve in such a way that said first end of the second pipe is housed in an opening of a first port of the second fluid valve and said second end of the second pipe is housed in an opening of a second port of the third fluid valve;
a third pipe:
having a first and a second end;
located between said third and fourth fluid valve in such a way that said first end of the third pipe is housed in an opening of a first port of the third fluid valve and said second end of the third pipe is housed in an opening of a second port of the fourth fluid valve;
a fourth pipe:
having a first and a second end;
located between said fourth and fifth fluid valve in such a way that said first end of the fourth pipe is housed in an opening of a first port of the fourth fluid valve and said second end of the fourth pipe is housed in an opening of a second port of the fifth fluid valve;
said third, fourth and fifth fluid valve being identical to said first and second fluid valve and said second, third and fourth pipe being identical to said first pipe.

For example, said first, second, third, fourth pipe have different lengths.

Preferably, that said first, second, third, fourth pipe have a length between 1 cm and 10 cm.

Preferably, said first, second, third, fourth pipe have a length between 2 cm and 5 cm.

Preferably, the pipes are inserted freely into the fluid valves.

Preferably, the third, fourth and fifth fluid valve comprise:
a third, a fourth and a fifth valve body;
said third valve body of the third fluid valve comprising at least two third ports;
said fourth valve body of the fourth fluid valve comprising at least two fourth ports;
said fifth valve body of the fifth fluid valve comprising at least two fifth ports;
a third, a fourth and a fifth lining of bodies of valves;
said third lining of the third valve body of the first valve comprising at least two openings (331, 332) positioned along the axis of the two third ports;
said fourth lining of the valve body of the fourth valve comprising at least two openings positioned along the axis of the two fourth ports;
said fifth lining of the valve body of the fifth valve comprising at least two openings positioned along the axis of the two fifth ports.

Preferably, said first second, third and fourth pipe form sealed connections between the valve bodies of said fluid valves.

For example, said compression means is an adjustable clamp positioned in such a way as to block and compress the pipes between said fluid valves.

For example, said compression means is a clamp positioned in such a way as to block and compress the pipes between said fluid valves.

BRIEF DESCRIPTION OF THE DRAWINGS

These aspects, as well as other aspects of the invention, will be clarified in the detailed description of specific embodiments of the invention, with reference being made to the drawings of the figures, in which.

The drawings of the figures are not to scale. In general, similar elements are labelled with similar references in the drawings. The presence of numbers for reference to the drawings cannot be considered to be limiting, including when these numbers are indicated in the claims.

DETAILED DESCRIPTION OF CERTAIN EMBODIMENTS OF THE INVENTION

Figure 1:
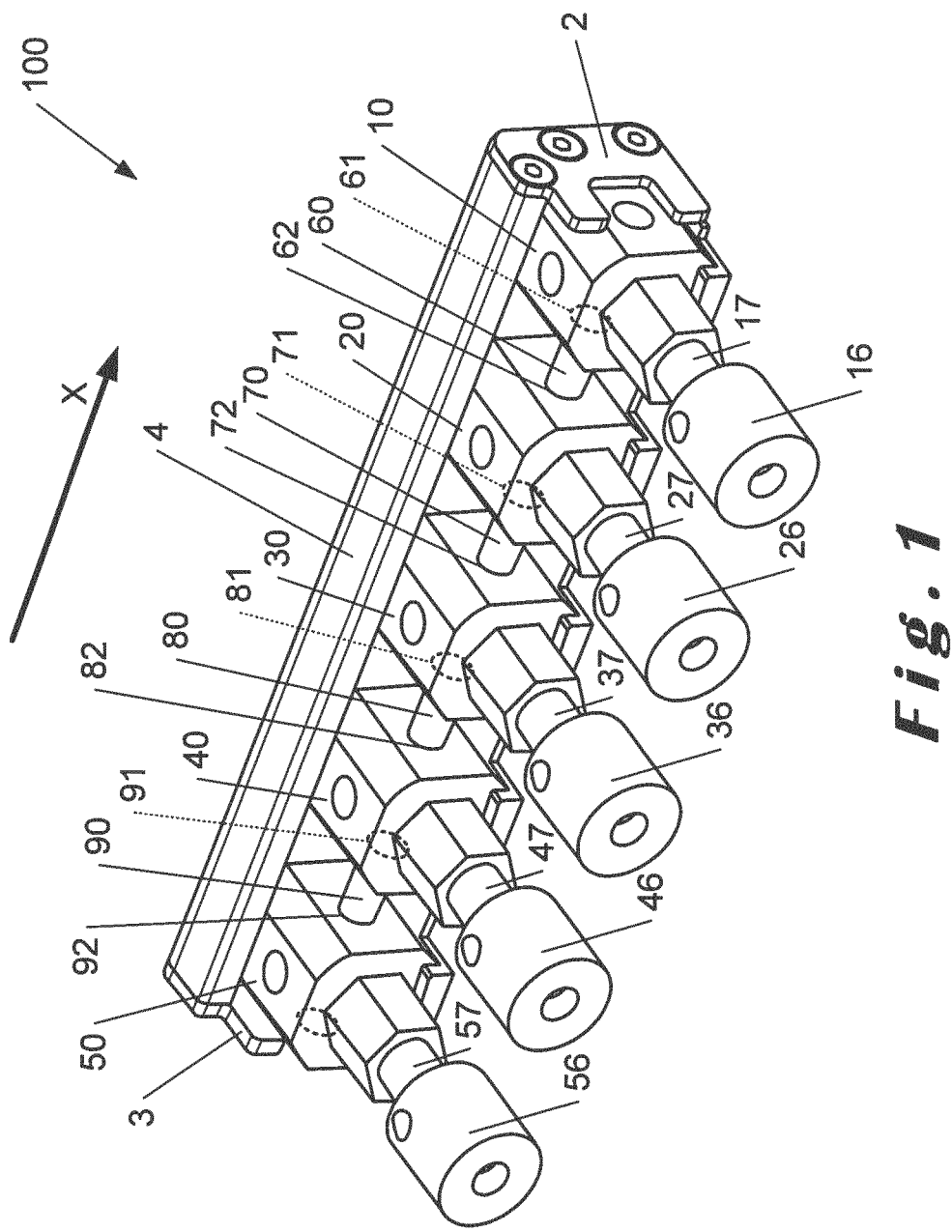
FIG. 1 shows a perspective view of an assembly of five valves connected by four pipes, the assembly being compressed by a compression means and corresponds to an embodiment according to the invention.
Figure 3:
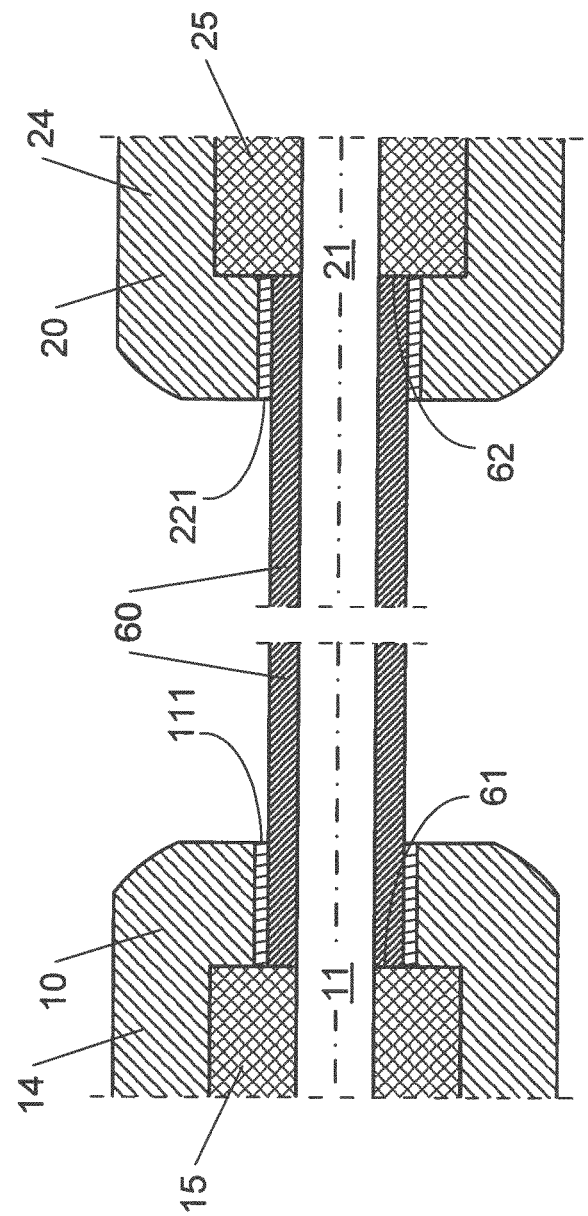
FIG. 3 shows a cross-sectional view of a first and second fluid valve connected by a first pipe according to the invention.

FIG. 1 shows an example of an embodiment of the system for fluid communication and of the method for connecting at least two fluid valves according to the invention. The method for connecting at least two fluid valves by a pipe requires providing at least two fluid valves. The fluid valves are valves allowing the control of the flow rate of fluid between their various openings. The fluid valves are valves allowing the control of the fluid connection between its various ports. For example, they allow ON/OFF control of the flow rate of fluid between a first and a second port. Stopcock valves having more than two ports allow, for example, one of the two outlet ports to be selected starting from an inlet port. Three-way T-valves are preferably used in the system and the method claimed. For uses in chemistry or in the synthesis of drugs, valves having inert walls are preferred. For example, valves having a valve body, the inner walls of which made of PTFE (Poly(tetrafluoroethylene)), as well as a valve member made of PTFE, are used. The pipes used to connect the fluid valves to each other in a fluid and sealed manner are preferably made of a chemically inert material and are for example made of PEEK (Poly(etheretherketone)). The pipes used to connect the fluid valves to each other are preferably made of a material having a flexibility lower than that of the bodies of valves. To connect the fluid valves to each other, at least one pipe is inserted into one of the ports of a first fluid valve. The ports of the fluid valves, as shown in FIG. 3 have openings in the lining of the valve body and openings in the valve body. The opening in the valve body has, for example, an inner thread in the lining of the valve body in order to receive a threaded element. The opening diameter in the lining of the valve body is greater than the opening diameter in the valve body. Thus, when a pipe is inserted into an opening of a fluid valve, it is stopped against the valve body and is maintained laterally because it is inserted into the opening of the lining of the valve body. The placement of the fluid valves and of the pipes in contact alone does not allow impermeability to be obtained. A sufficient compression force exerted on the pipe and on the fluid valve allows a sealed connection to be created. The connection obtained is impermeable to liquids or to gases, for pressures preferably between $1 \times 10^{-2}$ Pa and $1 \times 10^6$ Pa and more preferably for pressures between $1 \times 10^{-1}$ Pa and $5 \times 10^5$ Pa. A good seal is obtained without the addition of a sealing means. A sealing means is for example a flat joint or an O-ring. The system for fluid communication does not comprise a permanent joint for example such as a glue or a silicone joint. A good seal is obtained because of the pressure exerted on the pipe and on the valve. The pressure exerted allows the pipe and the valve body to be kept in contact and the pipe to be compressed onto the valve body. The difference in flexibility between the materials forming the bodies of valves of the fluid valves allows the pipe to slightly penetrated into the material of the valve body by thus creating a sealed connection. A difference in flexibility between the materials is obtained by selecting materials on the basis of their Young's modulus. The smaller the Young's modulus, the more flexible the material. The material used for the pipe thus has a Young's modulus greater than that of the valve body. The determination of the centre-to-centre distance between two valves must take into account, the penetration of the pipe into the valve body on either side of the pipe. The desired centre-to-centre distance and the length of the pipe determines the penetration to be achieved and thus the force to be applied by the first compression means. The penetration of the end of a pipe into the valve body is preferably between 0.01 mm and 0.2 mm and more preferably between 0.025 mm and 0.1 mm and is preferably 0.05 mm. Too little penetration not guaranteeing impermeability at high pressures and too much penetration can damage the fluid valve. The penetration of the ends of the pipes are uniformly distributed throughout the fluid assembly.

Pipes having different inner and outer diameters can be used. One outer pipe diameter used is preferably between 3 mm and 20 mm and is more preferably between 5 mm and 15 mm. One inner pipe diameter used is preferably between 0.2 mm and 18 mm and is more preferably between 0.5 mm and 5 mm.

For example, a pipe with an inner diameter of 1.5 mm, an outer diameter of 5 mm and a length of 21.3 mm.

Figure 2:
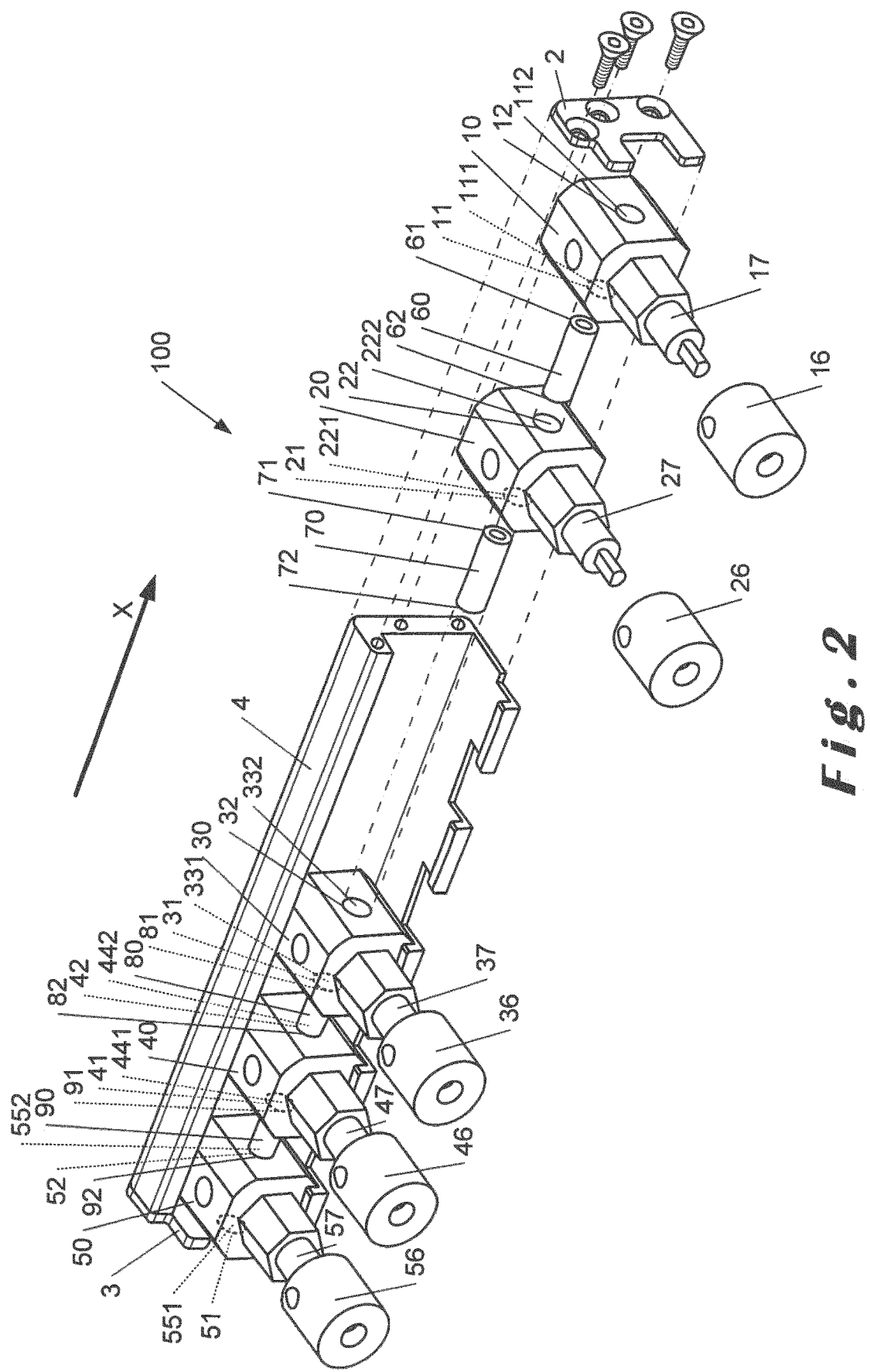
FIG. 2 shows an exploded perspective view showing the method of assembling the valves of the pipe between two ends of a compression means according to the invention.

FIG. 2 shows an example of an embodiment of the system for fluid communication and of the method for connecting at least two fluid valves according to the invention. The system for fluid communication is assembled by inserting the two ends of a pipe into the openings of two different valves, for example, the first pipe is inserted into the opening of a first valve and into the opening of a second valve. The fact that the pipe is inserted into the opening of the valve or that the valve is fitted onto the pipe via one of its openings is described in the present description by the fact that the pipe is inserted in one of the openings of one of the ports of the valve.

The fluid assembly, in addition to the compression means can consist of two valves and a pipe, of three valves and two pipes, of four valves and three pipes, of five valves and four pipes and up to 15 valves and fourteen pipes. The pipes connecting the valves in order to form the system for fluid communication preferably have a cross-section. The pipes connecting the valves in order to form the system for fluid communication preferably have lengths preferably between 10 mm and 100 mm, and more preferably lengths between 15 mm and 50 mm. The pipes of the same system for fluid communication according to the invention have, for example, different lengths. For example, a first pipe between a first fluid valve and a second fluid valve has a length of 30 mm and a second pipe 70 between a second fluid valve and a third fluid valve has a length of 45 mm.

In the embodiment described in FIG. 2, the system 100 for fluid communication is assembled in order to connect five fluid valves (10; 20; 30; 40; 50) via four pipes (60; 70; 80; 90) to each other. The first compression means 1 comprises a hollow profile 4 and a first end 2 and second end 3 that allow the compression of the fluid valves (10; 20; 30; 40; 50) and of the pipes (60; 70; 80; 90) inside the hollow profile 4. The first end 2 and second end 3 allow the hollow profile 4 to be plugged on either side and the fluid valves and pipe to be compressed via the fastening means 5. The fluid valves (10; 20; 30; 40; 50) and the pipes (60; 70; 80; 90) are then inserted alternatingly into the profile. Thus, the fifth fluid valve 50 is inserted into the hollow profile. Then the second end 92 of the fourth pipe 90 is inserted into the opening 552 of the second port 52 of the fifth fluid valve 50. Then the fourth fluid valve 40 is inserted and is fitted, via the opening 441 of its first port 41, onto the first end 91 of the fourth pipe 90. Then the second end 82 of the third pipe 80 is inserted into the opening 442 of the second port 42 of the fourth fluid valve 40. Then the third fluid valve 30 is inserted and is fitted, via the opening 331 of its first port 31, onto the first end 81 of the third pipe 80. Then the second end 72 of the second pipe 70 is inserted into the opening 332 of the second port 32 of the third fluid valve 30. Then the second fluid valve 20 is inserted and is fitted, via the opening 221 of its first port 21, onto the first end 71 of the second pipe 70. Then the second end 62 of the first pipe 60 is inserted into the opening 222 of the second port 22 of the second fluid valve 20. Then the first fluid valve 10 is inserted and is fitted, via the opening 111 of its first port 11, onto the first end 61 of the second pipe 60. After the installation, in the hollow profile 4, of the five fluid valves and of the four pipes, the first end 2 is fastened to the hollow profile 4 via the fastening means 5. The fastening of the first end 2 allows the five valves and four pipes to be compressed in order to guarantee sealed connections between fluid valves and pipes. The fastening means 5 are for example screws. The fastening means 5 allow the compression force exerted on the assembly of fluid valves and pipes to be varied. For example, the screws 5 are tightened in such a way that the plates forming the ends 2 and 3 are in contact with the hollow profile 4. The pressure exerted by the two ends 2 and 3 on the fluid valves located at the ends, preferably the first fluid valve 10 and fifth fluid valve 50, allows equal pressures to be obtained on each of the elements inside the system 100 for fluid communication. The length of the hollow profile 4 when the plates forming the ends 2; 3 are in contact with the hollow profile 4 forces the penetration of the pipes into the bodies of valves for suitable lengths.

FIG. 3 shows an example of an embodiment of the method according to the invention. The method for connecting at least two fluid valves in an impermeable manner via a pipe requires a sealed connection between each of the valves fluid and the pipe. The compression of the two fluid valves on either side of the pipe allows the pipe to be maintained between the two fluid valves. The compression of the two fluid valves 10 and 20 around the pipe 60 also allows a sealed connection between the pipe 60 and the two bodies of valves 15 and 25. The material used for the bodies of valves 15 and 25 is more flexible than the material used for the pipe 60. The difference in flexibility between the bodies of valves and the pipe allows greater deformation of the valve body than of the pipe for the same applied pressure. Indeed, the bodies of valves and the pipes deform proportionally to their modulus of elasticity. The pipe thus has a modulus of elasticity that is much greater than that of the valve body. Therefore, this means that during the compression of the valves 15 and 25 around the pipe 60, when subjected to the same pressure, the pipe will slightly penetrated into the valve body via the flexibility of the material of the valve body. The slight deformation of the valve body creates a sealed connection between the valve body and the pipe. For example, the pipe is made of metal. Preferably, the pipe is manufactured from a chemically inert material. Preferably, the pipe is made of a polymer and even more preferably, the pipe is made of Poly(etheretherketone) (PEEK). The valve body is manufactured from a chemically inert material. Preferably, the valve body is made from a polymer and even more preferably, the valve body is made from Poly(tetrafluoroethylene) (PTFE).

The pipe is maintained between the two valves laterally since said pipe is inserted into the openings 111 and 221 of the ports 11 and 21 of each of the valves 10 and 20. The openings 111 and 221 that allow access to the body of valves allow the pipe to be kept in contact with the bodies of valves. The maintaining of the pipes in contact with the valve bodies occurs after the pipe has been inserted into the openings 111 and 221 and as soon as a pressure is applied around the fluid valves 10 and 20. A sealed connection between the pipe 60 and the fluid valves is obtained without a sealing means such as a joint or glue. A sealed connection is for example obtained by using valves and pipes that have been disassembled and cleaned. The method according to the invention allows the use of fluid valves and of pipes that have been disassembled and cleaned.

Good impermeability of the fluid assembly is guaranteed by the correct cutting of the pipe: the cutting surfaces of the pipe must be smooth and perpendicular to the axis of the pipe. The bottom of the openings of the valves are preferably parallel to each other and perpendicular to the cutting surfaces of the pipe. The openings of two adjacent valves connected by a pipe are preferably collinear. The difference in modulus of elasticity of the pipe and of the bottom of the valve openings allows, for example, compensation for possible defects in positioning and cutting of the pipes. The choice of a pipe having an outer diameter very slightly less than the diameter of the openings of valves is preferable in order to allow easier positioning of the pipe.

Figure 4:
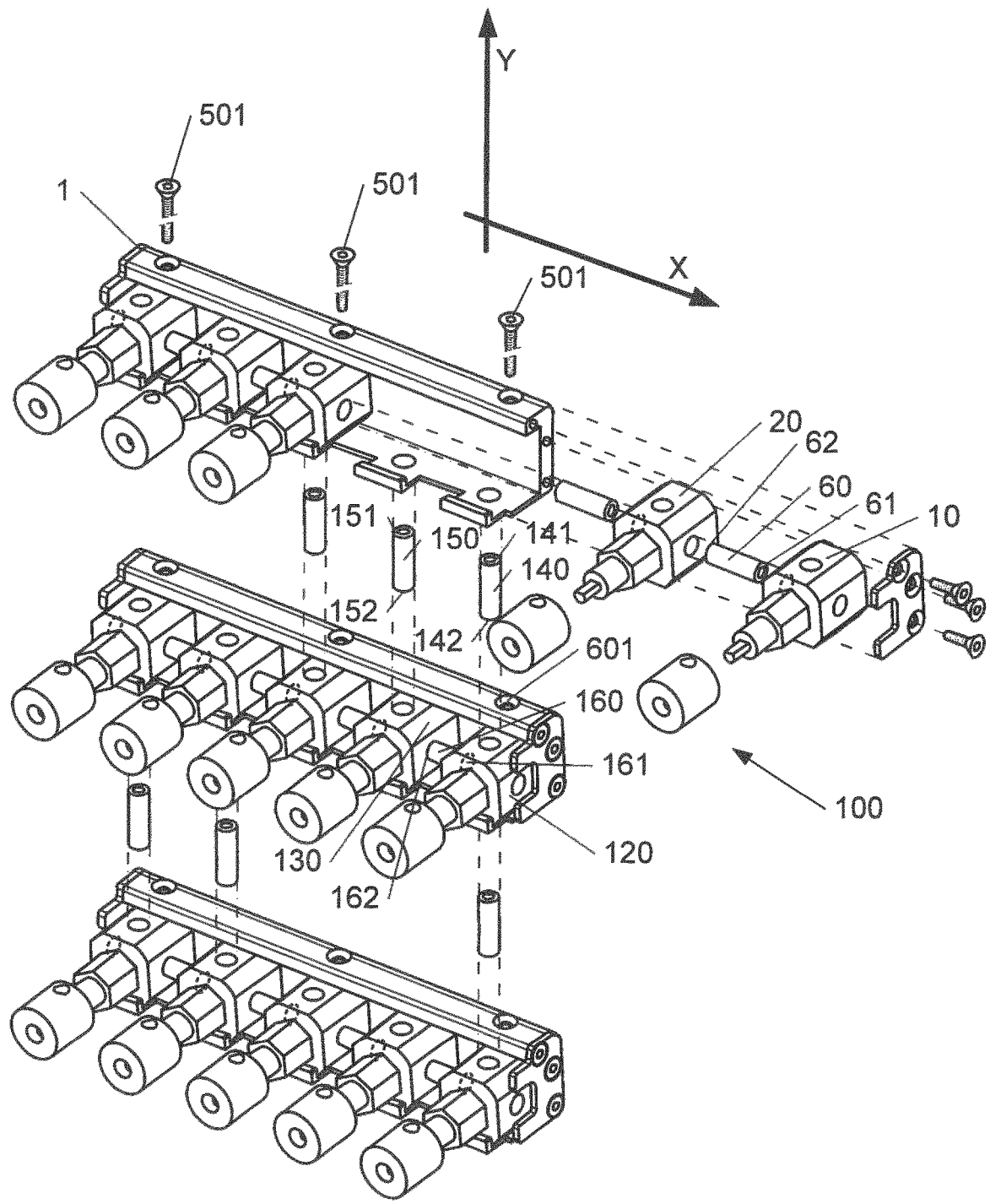

FIG. 4 shows a fluid assembly in a first direction X and a second direction Y. This embodiment allows the creation of an extended fluid assembly consisting of fluid valves and of pipes in a first direction X and a second direction Y. This embodiment according to the invention involves the fluid connection of a plurality of elements as described in FIGS. 1 and 2. A fluid assembly in only the first direction X is called a row of fluid valves and comprises an assembly of fluid valves and of pipes. This embodiment allows a plurality of rows of fluid valves and of pipes to be connected in order to allow fluid communication between the various rows. This embodiment preferably comprises a plurality of means for compression in the first direction X and at least one means for compression in the second direction Y.

In order to allow a fluid connection between a first and a second row of fluid valves, the hollow profile comprises orifices allowing the passage of a pipe between a fluid valve having an opening on its lower face and a fluid valve having an opening on its upper face. The orifice in the hollow profile is preferably wider than the outer diameter of the pipe. In order to guarantee the correct assembly of two rows of fluid valves in the second direction Y, preferably at least two pipes are positioned between a first and a second row. A pipe can, for example, be positioned in order to guarantee a centre-to-centre distance between the two rows of fluid valves without allowing fluid communication between two fluid valves.

Flexible pipes can, for example, allow communication between valves located in two different rows. Flexible pipes can, for example, allow communication between valves located in three different rows.

Preferably, two rows each comprising a means for compression in the first direction X can be connected in a fluid manner to each other via a flexible pipe. For example, a flexible pipe can connect the port of a fluid valve of a first row to the port of a fluid valve of a second row. For example, a plurality of rows of fluid valves can be connected in a fluid manner by pipes flexible. Preferably, the fact that a plurality of rows are connected in a fluid manner does not necessarily require a means for compression in the second direction Y.

The first, second and third rows of fluid valve can comprise five fluid valves each. Three rows connected to each other in a fluid manner by a means for compression in the second direction Y form a system 100 for fluid communication comprising 15 fluid valves. A system 100 for fluid communication can also be made without a means for compression in the second direction Y via flexible pipes for example. Flexible pipes are connected in a fluid manner and in a sealed manner to the fluid valves via ends of pipes provided with threaded nozzle. Flexible pipes can also have nozzles allowing a sealed fluid connection without a thread. A first row of fluid valves is as described in FIGS. 1 and 2. A second row of fluid valves comprises a sixth fluid valve 120, a seventh fluid valve 130, an eighth, a ninth and a tenth fluid valve connected to each other by a seventh pipe 160, an eighth, a ninth and a tenth pipe, these fluid valves and pipes being compressed by a third compression means 601. A third row of fluid valves comprises an eleventh, a twelfth, a thirteenth, a fourteenth and a fifteenth fluid valve connected to each other by an eleventh, twelfth, thirteenth and fourteenth pipe and compressed by a fourth means for compression in the first direction X.

For example, the third fluid valve comprised in the first row can be connected in a fluid manner to the fifth fluid valve comprised in the third row via a flexible pipe. Flexible pipes can be used in the case or rigid pipes form a fluid connection in the second direction Y via a second compression means 501.

The second compression means 501 allows a compression force to be applied between at least two fluid valves and at least one pipe in a second direction Y. The first compression means 1, second compression means 501 and third compression means 601 allow compression forces to be applied simultaneously in the first and second directions X and Y.

This embodiment allows the formation of a mesh of fluid valves, in which the connections between the fluid valves can be chosen according to the number of ports of each of the valve fluid, the position of the ports with respect to the nearby valves, and the type of valve (for example a T-valve or an L-valve for a valve has three ports). This mode of created allows certain ports to be left accessible in order to be able to connect a syringe or a flexible pipe thereto, for example.

The present invention has been described with respect to modes of specific creations, which have a purely illustrative value and must not be considered to be limiting. In general, the present invention is not limited to the examples illustrated and/or described above. The use of the verbs "comprise", "include", or any other variant, as well as their conjugations, cannot in any way exclude the presence of elements other than those mentioned. The use of the indefinite article "a", "an" or of the definite article "the" in order to introduce an element does not exclude the presence of a plurality of these elements. The reference numbers in the claims do not limit their scope.

To summarise, the invention can also be described as follows. Method for connecting, in a fluid manner, a system for fluid communication comprising a first and a second fluid valve and comprising the following steps:
  providing a first and a second fluid valve,
  providing a first pipe,
  inserting each of the ends of the first pipe into each of the fluid valves in order to form a fluid assembly,
  providing a compression means comprising two ends,
  positioning said two ends of said compression means on either side of said fluid assembly,
applying a compression force to said fluid assembly via the compression means.

The invention claimed is:

1. A method for connecting, in a fluid manner, a first, fluid valve and a second fluid valve in a first direction X and comprising the following steps:
  a. providing said first and second fluid valve,
    said first fluid valve comprising at least two first ports, each having an opening towards the outside;
    said second fluid valve comprising at least two second ports, each having an opening towards the outside;
  b. providing a first pipe having a first end and a second end:
    the first end being suitable for being inserted into the opening of one of the first ports of the first fluid valve;
    the second end being suitable for being inserted into the opening of one of the second ports of the second fluid valve;
  c. inserting the first end of the first pipe into the opening of one of the first ports of the first fluid valve, and inserting the second end of the first pipe into the opening of one of the second ports of the second fluid valve to form a fluid assembly;
  d. providing a first compression means comprising:
    two ends being two plates compressing said fluid assembly comprising said first and second fluid valves and said first pipe in said first direction X between said two ends
    a hollow profile configured to receive the first and second fluid valves;
    a fastening means for fastening the two plates to two ends of the hollow profile;
  e. positioning said two ends being two plates of said first compression means on either side of said fluid assembly in said first direction X; and
  f. applying a compression force, in parallel to said first direction X, onto said fluid assembly via said first compression means to compress said first pipe between said first and second fluid valves.

2. The method according to claim 1, wherein:
  step a. further comprises providing, a third, a fourth, and a fifth fluid valves;
    said third fluid valve comprising at least two third ports, each having an opening towards the outside;
    said fourth fluid valve comprising at least two fourth ports, each having an opening towards the outside;
    said fifth fluid valve comprising at least two fifth ports, each having an opening towards the outside;

step b. further comprises providing a second, a third, and a fourth pipes;
said second pipe having a first end and a second end:
the first end of the second pipe being suitable for being inserted into the opening of one of the second ports of the second fluid valve;
the second end of the second pipe being suitable for being inserted into the opening of one of the third ports of the third fluid valve;
said third pipe having a first end and a second end:
the first end of the third pipe being suitable for being inserted into the opening of one of the third ports of the third fluid valve;
the second end of the second pipe being suitable for being inserted into the opening of one of the fourth ports of the fourth fluid valve;
said fourth pipe having a first end and a second end:
the first end of the fourth pipe being suitable for being inserted into the opening of one of the fourth ports of the fourth fluid valve;
the second end of the fourth pipe being suitable for being inserted into the opening of one of the fifth ports of the fifth fluid valve and;
step c. further comprises:
inserting the first end of the second pipe into the opening of one of the second ports of the second fluid valve, and inserting the second end of the second pipe into the opening of one of the third ports of the third fluid valve;
inserting the first end of the third pipe into the opening of one of the third ports of the third fluid valve, and inserting the second end of the third pipe into the opening of one of the fourth ports of the fourth fluid valve; and
inserting the first end of the fourth pipe into the opening of one of the fourth ports of the fourth fluid valve, and inserting the second end of the fourth pipe into the opening of one of the fifth ports of the fifth fluid valve;
to form said fluid assembly.

3. The method according to claim 2, wherein:
step a. further comprises providing a sixth fluid valve and a seventh fluid valve;
said sixth fluid valve comprising at least two sixth ports, each having an opening towards the outside;
said seventh fluid valve comprising at least two seventh ports, each having an opening towards the outside;
step b. further comprises providing a fifth pipe, a sixth pipe, and a seventh pipe;
said fifth pipe having a first end and a second end:
the first end of the fifth pipe being suitable for being inserted into the opening of one of the first ports of the first fluid valve;
the second end of the second pipe being suitable for being inserted into the opening of one of the sixth ports of the sixth fluid valve;
said sixth pipe having a first end and a second end:
the first end of the sixth pipe being suitable for being inserted into the opening of one of the second ports of the second fluid valve;
the second end of the sixth pipe being suitable for being inserted into the opening of one of the seventh ports of the seventh fluid valve;
said seventh pipe having a first end and a second end:
the first end of the seventh pipe being suitable for being inserted into the opening of one of the sixth ports of the sixth fluid valve;
the second end of the seventh pipe being suitable for being inserted into opening of one of the seventh ports of the seventh fluid valve;
step c. further comprises:
inserting the first end of the fifth pipe into the opening of one of the first ports of the first fluid valve, and inserting the second end of the fifth pipe into the opening of one of the sixth ports of the sixth fluid valve;
inserting the first end of the sixth pipe into the opening of one of the second ports of the second fluid valve, and inserting the second end of the sixth pipe into the opening of one of the seventh ports of the seventh fluid valve;
inserting the first end of the seventh pipe into the opening of one of the sixth ports of the sixth fluid valve, and inserting the second end of the seventh pipe into the opening of one of the seventh ports of the seventh fluid valve, to form an extended fluid assembly;
step d. further comprises:
providing a second compression means comprising two ends to compress said extended fluid assembly in a second direction Y between said two ends;
providing a third compression means comprising two ends to compress said sixth and seventh fluid valves and said seventh pipe in the first direction X between said two ends;
step e. further comprises:
positioning said two ends of said second compression means on either side of said extended fluid assembly in said second direction Y;
positioning said two ends of said third compression means on either side of said sixth and seventh fluid valves and said seventh pipe in said first direction X; and
step f. further comprises applying a compression force in parallel to said second direction Y onto said extended fluid assembly via said second compression means to compress said fifth and sixth pipes together with said first and sixth fluid valves and said second and seventh fluid valves, respectively.

4. A system for fluid communication comprising:
a fluid assembly comprising:
a first fluid valve and a second fluid valve in a first direction X:
said first fluid valve comprising two first ports, each having an opening towards the outside;
said second fluid valve comprising two second ports, each having an opening towards the outside;
a first pipe:
having a first end and a second end;
located between said first fluid valve and second fluid valve such that said first end of the first pipe is housed in the opening of one of the first ports of the first fluid valve, and said second end of the first pipe is housed in the opening of one of the second ports of the second fluid valve; and
a first compression means, mechanically coupled to said fluid assembly, and comprising:
a hollow profile suitable for receiving the fluid valves;
two ends located on either side of said fluid assembly, suitable for compressing said fluid valves in said profile, and said first pipe between said first and second fluid valve, in said first direction X; and
means for fastening said ends of the first compression means to said profile.

5. The system for fluid communication according to claim 4, wherein the first and second fluid valve comprise, respectively:
- a first valve body and a second valve body;
    - said first valve body of the first fluid valve comprising two first ports;
    - said second valve body of the second fluid valve comprising two second ports;
- a first valve-body lining and a second valve-body lining;
    - said first lining of the valve body of the first valve comprising two openings centered on the two first ports;
    - said second lining of the valve body of the second valve comprising two openings centered on the two second ports.

6. The system for fluid communication according to claim 5, wherein said first and second valve bodies are made of a plastic material.

7. The system for fluid communication according to claim 5, wherein said first and second valve bodies are made of a polymer resistant to solvents.

8. The system for fluid communication according to claim 5, wherein the material of said valve bodies is more flexible than the material of said first pipe.

9. The system for fluid communication according to claim 4, wherein the fluid connections between said first and second ends of said pipe and the first and second valves are sealed for pressures between atmospheric pressure and $5 \times 10^5$ Pa.

10. The system for fluid communication according to claim 4, further comprising a controlled system for controlling fluid valves.

11. The system for fluid communication according to claim 4, further comprising a first coupling means and a second coupling means and a first valve stem and a second valve stem, wherein:
- said first valve stem allows the movement of said first fluid valve being connected to said controlled system for controlling fluid valves by said first coupling means;
- said second valve stem allows the movement of said second fluid valve being connected to said controlled system for controlling fluid valves by said first coupling means.

12. The system for fluid communication according to claim 5, further comprising a third, fourth and fifth fluid valve, wherein the third, fourth and fifth fluid valves comprise:
- a third, a fourth, and a fifth valve body;
    - said third valve body of the third fluid valve comprising at least two third ports;
    - said fourth valve body of the fourth fluid valve comprising at least two fourth ports;
    - said fifth valve body of the fifth fluid valve comprising at least two fifth ports;
- a third, a fourth, and a fifth lining of valve bodies;
    - said third lining of the third valve body of the first valve comprising at least two openings positioned along the axis of the two third ports;
    - said fourth lining of the fourth valve body of the fourth valve comprising at least two openings positioned along the axis of the two fourth ports;
    - said fifth lining of the fifth valve body of the fifth valve comprising at least two openings positioned along the axis of the two fifth ports.

13. The system for fluid communication according to claim 4, wherein the fluid assembly comprises:
- a third, a fourth, and a fifth fluid valve:
    - said third fluid valve comprising at least two third ports, each having an opening towards the outside;
    - said fourth fluid valve comprising at least two fourth ports, each having an opening towards the outside;
    - said fifth fluid valve comprising at least two fifth ports, each having an opening towards the outside;
- a second pipe:
    - having a first end and a second end;
    - located between said second and third fluid valves such that said first end of the second pipe is housed in the opening of one of the second ports of the second fluid valve and said second end of the second pipe is housed in the opening of one of the third ports the third fluid valve;
- a third pipe:
    - having a first end and a second end;
    - located between said third and fourth fluid valves such that said first end of the third pipe is housed in the opening of a first one of the third ports of the third fluid valve and said second end of the third pipe is housed in the opening of a second one of the fourth ports of the fourth fluid valve;
- a fourth pipe:
    - having a first end and a second end;
    - located between said fourth and fifth fluid valves such that said first end of the fourth pipe is housed in the opening of a first one of the fourth ports of the fourth fluid valve and said second end of the fourth pipe is housed in the opening of a second one of the fifth ports of the fifth fluid valve;
- said third, fourth, and fifth fluid valves being identical to said first and second fluid valves and said second, third, and fourth pipes being identical to said first pipe.

14. The system for fluid communication according to claim 13, wherein the fluid assembly further comprises:
- a sixth fluid valve and a seventh fluid valve:
    - said sixth fluid valve comprising at least two sixth ports, each having an opening towards the outside;
    - said seventh fluid valve comprising at least two seventh ports, each having an opening towards the outside;
- a fifth pipe:
    - having a first end and a second end in a second direction Y;
    - located between said first and sixth fluid valves such that said first end of the fifth pipe is housed in the opening of one of the first ports of the first fluid valve and said second end of the fifth pipe is housed in the opening of one of the sixth ports of the sixth fluid valve;
- a sixth pipe:
    - having a first end and a second end in said second direction Y;
    - located between said second and seventh fluid valves such that said first end of the sixth pipe is housed in the opening of one of the second ports of the second fluid valve and said second end of the sixth pipe is housed in the opening of one of the seventh ports of the seventh fluid valve;
- a seventh pipe:
    - having a first end and a second end in said first direction X;
    - located between said sixth and seventh fluid valves such that said first end of the seventh pipe is housed in the opening of one of the sixth ports of the sixth fluid valve and said second end of the sixth pipe is housed in the opening of one of the seventh ports of the seventh fluid valve;

to form an extended fluid assembly, said extended fluid assembly further comprising:

a second compression means, mechanically coupled to said extended fluid assembly, and comprising at least two ends located on either side of said extended fluid assembly in said second direction Y, to compress said fifth and sixth pipes between said first and sixth fluid valves and said second and seventh fluid valves, respectively;

a third compression means, mechanically coupled to said sixth and seventh fluid valves and said seventh pipe, comprising at least two ends located on either side of said sixth and seventh fluid valves and said seventh pipe, in said first direction X, to compress said seventh pipe between said sixth and seventh fluid valves;

said sixth and seventh fluid valves having outer dimensions identical to said first and second fluid valves, said seventh pipe being identical to said first pipe and said fifth and sixth pipes being identical to each other.

15. The system for fluid communication according to claim 13, wherein the first, second, third, and fourth pipes are inserted freely into the first, second, third, fourth, and fifth fluid valves.

* * * * *